E. V. DE YOUNG & L. TERWILLIGER.
NUT LOCK.
APPLICATION FILED DEC. 29, 1917.

1,298,469.

Patented Mar. 25, 1919.

WITNESSES

INVENTORS
E. V. DeYoung,
L. Terwilliger,
BY Victor J. Evans
ATTORNEY

UNITED STATES PATENT OFFICE.

ERNEST V. DE YOUNG AND LEE TERWILLIGER, OF CRYSTAL, MICHIGAN.

NUT-LOCK.

1,298,469.  Specification of Letters Patent.  Patented Mar. 25, 1919.

Application filed December 29, 1917. Serial No. 209,535.

*To all whom it may concern:*

Be it known that we, ERNEST V. DE YOUNG and LEE TERWILLIGER, citizens of the United States, residing at Crystal, in the county of Montcalm and State of Michigan, have invented new and useful Improvements in Nut-Locks, of which the following is a specification.

This invention relates to means for locking a nut upon a bolt to retain the nut adjusted upon the bolt, and also to permit of the unscrewing of the nut from the bolt when desired.

With this object in view, the invention resides in the construction, combination and operative arrangement of parts set forth in the following description and falling within the scope of what is claimed.

Figure 1:
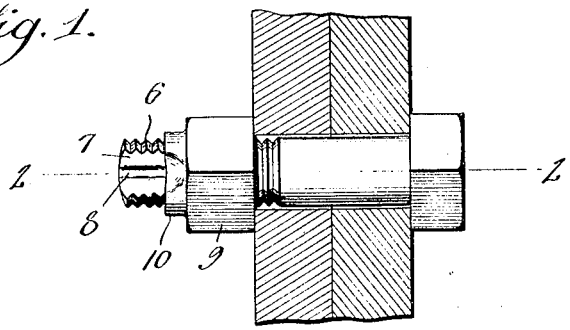
Figure 1 is a view showing a nut locked upon a bolt in accordance with this invention.
Figure 2:
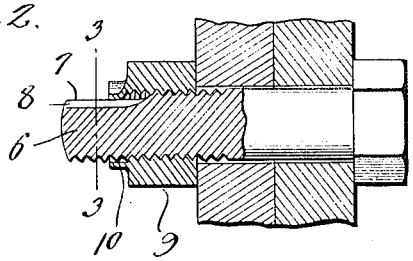
Fig. 2 is a sectional view approximately on the line 2—2 of Fig. 1.
Figure 3:
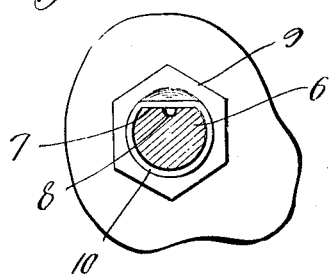
Fig. 3 is a sectional view approximately on the line 3—3 of Fig. 2.
Figure 4:
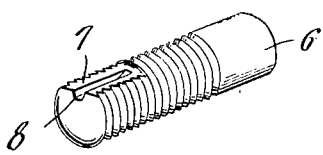
Fig. 4 is a perspective view of the shank of the bolt.
Figure 5:
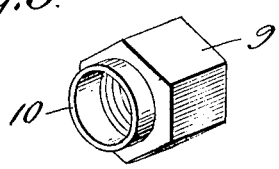
Fig. 5 is a perspective view of the lock nut.

Referring now to the drawing in detail, the numeral 6 designates a bolt of any ordinary construction, the same having its shank, for the entire length thereof, if desired, or for any suitable length, from its outer end, formed with a flat surface 7, and the said flat surface, at the center thereof, is provided with a longitudinal channel 8.

The nut is indicated by the numeral 9 and has upon its outer face a compressible sleeve 10. The sleeve surrounds the bore of the nut, but, as illustrated by the drawings, is not provided with internal threads. The nut, when screwed upon the bolt has the sleeve portion thereof compressed, in any desired or suitable manner against the flat surface of the bolt, thus holding the nut against turning upon the bolt. By the insertion of a suitable pointed instrument in the slot or channel in the flat surface of the bolt, the sleeve may be bulged outwardly to assume its normal contour and the nut may be thus readily unscrewed from the bolt.

Having thus described the invention what we claim is:

The combination with a bolt having its threaded shank provided with a flat non-threaded surface, and said non-threaded surface being provided with a longitudinally extending groove, a nut screwed upon the bolt, said nut having its outer face provided with a compressible sleeve surrounding the bore thereof, the inner surface of the said sleeve being non-threaded, and said sleeve designed to be compressed against the flat surface of the bolt but not to enter the groove in the said flat surface, whereby an instrument may be inserted in the groove to engage with the compressed portion of the sleeve to bulge the same outwardly to its initial shape, to permit of the unscrewing of the nut from the bolt.

In testimony whereof we affix our signatures.

ERNEST V. DE YOUNG.
LEE TERWILLIGER.